(12) United States Patent
Hashimoto et al.

(10) Patent No.: US 7,586,304 B2
(45) Date of Patent: Sep. 8, 2009

(54) STATOR POSITION MEASURING METHOD AND MEASURING DEVICE

(75) Inventors: Shingo Hashimoto, Anjo (JP); Yoshihisa Yamada, Anjo (JP); Takeshi Tomita, Anjo (JP); Takao Taniguchi, Anjo (JP); Shigeharu Ikeda, Anjo (JP)

(73) Assignee: Aisin AW Co., Ltd., Anjo (JP)

(*) Notice: Subject to any disclaimer, the term of this patent is extended or adjusted under 35 U.S.C. 154(b) by 479 days.

(21) Appl. No.: 11/635,621

(22) Filed: Dec. 8, 2006

(65) Prior Publication Data

US 2007/0130753 A1 Jun. 14, 2007

(30) Foreign Application Priority Data

Dec. 9, 2005 (JP) ............................. 2005-356436
Dec. 9, 2005 (JP) ............................. 2005-356438
Dec. 9, 2005 (JP) ............................. 2005-356443

(51) Int. Cl.
  *G01B 7/14* (2006.01)
(52) U.S. Cl. ................................. 324/207.26; 318/653
(58) Field of Classification Search ............... 324/207.2; 318/652–653
See application file for complete search history.

(56) References Cited

U.S. PATENT DOCUMENTS 4,870,358 A * 9/1989 Glaize et al. ............ 324/207.22
2005/0134993 A1* 6/2005 Hoefer et al. ................. 360/75

FOREIGN PATENT DOCUMENTS

| JP | U-63-40154 | 3/1988 |
| JP | A-07-241050 | 9/1995 |
| JP | A-2001-320850 | 11/2001 |
| JP | A-2006-254519 | 9/2006 |

* cited by examiner

*Primary Examiner*—Jay M Patidar
(74) *Attorney, Agent, or Firm*—Oliff & Berridge, PLC

(57) ABSTRACT

A stator position measuring method and device relating to a motor driving device including a motor case, a rotor, and a stator disposed on an outer periphery of the rotor concentrically with the rotor, includes measuring a position of the stator relative to an axial center of the rotor, wherein the position of the stator is determined in a rotor not-inserted state, in which the stator is housed inside the motor case and the rotor is not inserted in the stator, by measuring a position of a radial surface of a stator core, which includes a magnetic body or a conductor forming the stator, relative to the axial center of the rotor using a non-contact displacement sensor that is selectively sensitive to the magnetic body or the conductor.

23 Claims, 11 Drawing Sheets

FIG. 3A
FIG. 3B
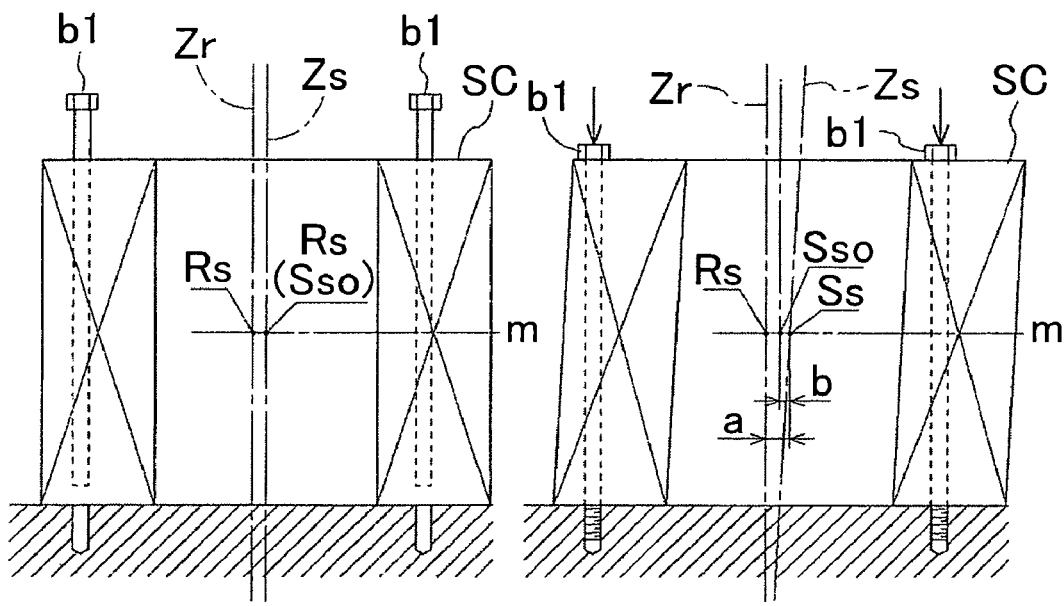
FIG. 3C
FIG. 3D
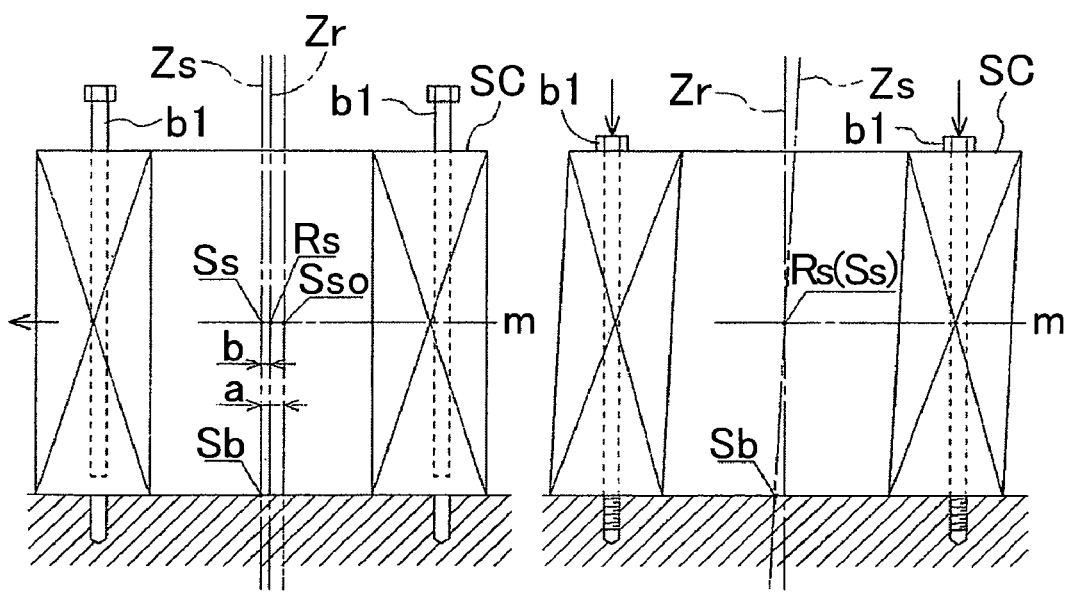

STATOR POSITION MEASURING METHOD AND MEASURING DEVICE

INCORPORATION BY REFERENCE

The disclosure of Japanese Patent Application Nos. 2005-356436 filed on Dec. 9, 2005, 2005-356443 filed on Dec. 9, 2005, and 2005-356438 filed on Dec. 9, 2005, including the specifications, drawings and abstracts are incorporated herein by reference in its entirety.

BACKGROUND

The present invention relates to a motor driving device and to a stator position measuring method and measuring device.

Hybrid vehicles with an engine and a motor driving device as drive sources have gained attention with respect to fuel efficiency, environmental protection, and so on. In the hybrid vehicles, the motor driving device acts as a motor that obtains power from a battery in order to generate a driving force, and transmits the driving force to a running mechanism side, to thereby cause the vehicle to run on the motor. The motor driving device may also act as a generator that obtains a driving force from the engine and uses this driving force to charge the battery. The motor driving device also performs a so-called regeneration operation in which the surplus inertial force of the vehicle is collected as power during braking. The motor driving device may also be used during engine start-up.

Accordingly, a rotor of the motor driving device provided in a hybrid vehicle is drivingly connected to a speed change mechanism side and an engine side to enable transfer of the driving force.

The motor driving device includes a stator and the rotor housed inside the stator, and the stator and rotor are supported from a motor case side. The stator is fixedly supported, whereas the rotor is rotatably supported from a shaft-support portion provided in the motor case. In a hybrid vehicle, the motor case is rarely provided separately, and typically a part of a transmission case housing the speed change mechanism in its interior doubles as the motor case.

In the motor driving device, the gap and concentricity between the stator and rotor are extremely important elements for determining the performance of the motor driving device, and are therefore managed and adjusted strictly.

Japanese Patent Application Publication No. JP-A-7-241050 discloses a technique for performing this type of adjustment. This technique relates to a gap adjustment device for an electric automobile motor that adjusts the gap by providing adjusting bolts in an upright manner in a flywheel housing (equivalent to the motor case described heretofore), and adjusts an outer peripheral location of a stator core. A stator in this example is comparatively thin. In other words, the stator thickness in the direction of a rotary axis (which shares an axial center with the stator) of the rotor is comparatively small.

SUMMARY

However, in the adjustment method described in Japanese Patent Application Publication No. JP-A-7-241050, components (the adjusting bolts) other than the essential components of the motor driving device are required. Moreover, bolt holes must be provided in the motor case, and therefore this adjustment method is not preferable.

Furthermore, in recent years it has become necessary to increase the thickness of the motor driving device in the axial direction of the rotor in order to satisfy the performance requirements of the motor driving device for a hybrid vehicle. FIG. 1 is a pattern diagram showing the schematic structure of a thick motor driving device constructed to respond to these requirements. The left side of the drawing corresponds to an engine room ER side in which an engine E is disposed, and the right side of the drawing corresponds to a speed change mechanism chamber TR side in which a speed change mechanism T is disposed.

A stator S includes a stator core SC and a stator coil SW positioned relative to the stator core SC. The stator coil SW is impregnated with varnish so as to be fixed in an insulated state.

As shown in FIG. 2, the stator core SC is constructed by laminating a large number of substantially annular steel plates p, and is fixedly fastened to a motor case by fastening bolts b1 that penetrate fixing portions that are provided at a predetermined phase in the circumferential direction of each steel plate p in the lamination direction. Further, caulking, a welding processing, or similar process is implemented on the steel plates p constructing the stator core SC at a predetermined phase in the circumferential direction so that relative movement between the steel plates p is restricted to a certain extent.

The position of the stator core in the left-right direction of FIG. 1 (equivalent to the axial direction of the rotor) is determined according to a seating surface provided on the motor case. The position thereof in the up-down direction (equivalent to the radial direction of the rotor), on the other hand, is determined by tightening the aforementioned fastening bolts since the housing space on the motor case side has some comparative leeway.

In the structure described above, when the stator thickness (the thickness in the axial direction of the rotor) is comparatively thin, as in the technique disclosed in Japanese Patent Application Publication No. JP-A-7-241050, no problems arise when the stator position relative to the axial center of the rotor (the stator axial center position) is maintained at roughly the same relative position. However, as the requirements of the motor increase and the thickness of the motor driving device increases, vibrations generated by the rotating motor (including unevenness in the rotation of the rotor) increases when a conventional management method is applied.

The present inventors discovered through investigation that the cause of this problem is deformation of the stator core generated when the fastening bolts are tightened. FIGS. 3A and 3B illustrate this deformation. The drawings show a state in which a laminated stator core is disposed vertically, FIG. 3A illustrates a state in which the fastening bolts are not tightened, and FIG. 3B illustrates a state in which the fastening bolts are tightened. In FIG. 3B, when the fastening bolts are tightened, relative movement occurs between the steel plates according to the individual characteristics of the stator core, and as a result it becomes impossible to maintain the linearity of the axial center of the stator. In this state, a core axial center position in a thickness direction intermediate position of the stator core deviates from the axial center of the rotor, and an adjustment must be performed.

Further, to perform such stator positioning adjustment accurately and speedily, it is necessary to know the precise position of the stator core relative to the axial center of the rotor. However, substances such as fixing varnish are adhered to the surface of the stator core. Because of this varnish and so on, it is difficult to measure the position of the stator core accurately.

The present invention thus provides, among other things, a stator position measuring method and measuring device with which the position of a stator core relative to the axial center of a rotor can be measured accurately so that stator positioning adjustment can be performed accurately and speedily.

A stator position measuring method, according to an exemplary aspect of the invention, relating to a motor driving device including a motor case, a rotor, and a stator disposed on an outer periphery of the rotor concentrically with the rotor, includes measuring a position of the stator relative to an axial center of the rotor, wherein the position of the stator is determined in a rotor not-inserted state, in which the stator is housed inside the motor case and the rotor is not inserted in the stator, by measuring a position of a radial surface of a stator core, which includes a magnetic body or a conductor forming the stator, relative to the axial center of the rotor using a non-contact displacement sensor that is selectively sensitive to the magnetic body or the conductor.

A stator position measuring device, according to an exemplary aspect of the invention, relating to a motor driving device including a motor case, a rotor, and a stator disposed on an outer periphery of the rotor concentrically with the rotor, includes a non-contact displacement sensor that is selectively sensitive to a magnetic body or a conductor that measures a position of the stator relative to an axial center of the rotor; and a support that is positioned inside the motor case in a rotor not-inserted state, in which the stator is housed inside the motor case and the rotor is not inserted in the stator, wherein the displacement sensor is positioned by the support so as to be capable of measuring a position of a radial surface of a stator core, which is includes the magnetic body or the conductor forming the stator, relative to the axial center of the rotor, and the position of the stator is determined on the basis of an output of the displacement sensor.

BRIEF DESCRIPTION OF THE DRAWINGS

Various exemplary aspects of the invention will be described with reference to the drawings, wherein:

FIGS. 3A-3D are illustrative views showing deformation of a stator core accompanying fastening;

DETAILED DESCRIPTION OF EMBODIMENTS

The structure around a motor driving device M that is subjected to stator position measurement/adjustment using a measurement adjustment device 1 functioning as a stator position measuring device according to the present invention, the structure of the measurement adjustment device 1, and an operation for fixing a stator S using the device 1 will be described below in sequence.

Structure Around Motor Driving Device

Figure 1:
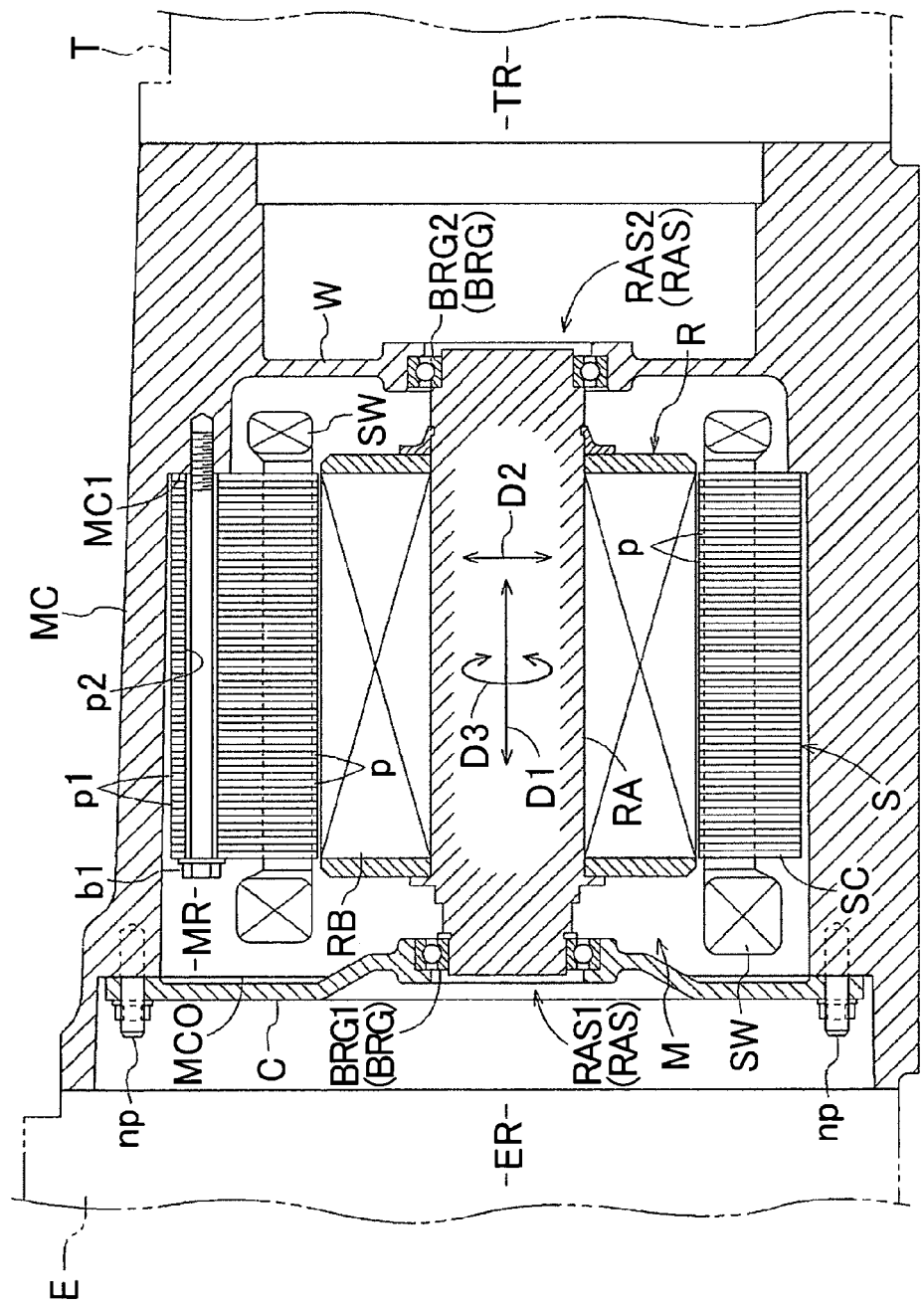
FIG. 1 is a view showing the cross-sectional structure of a motor driving device chamber.
Figure 2:
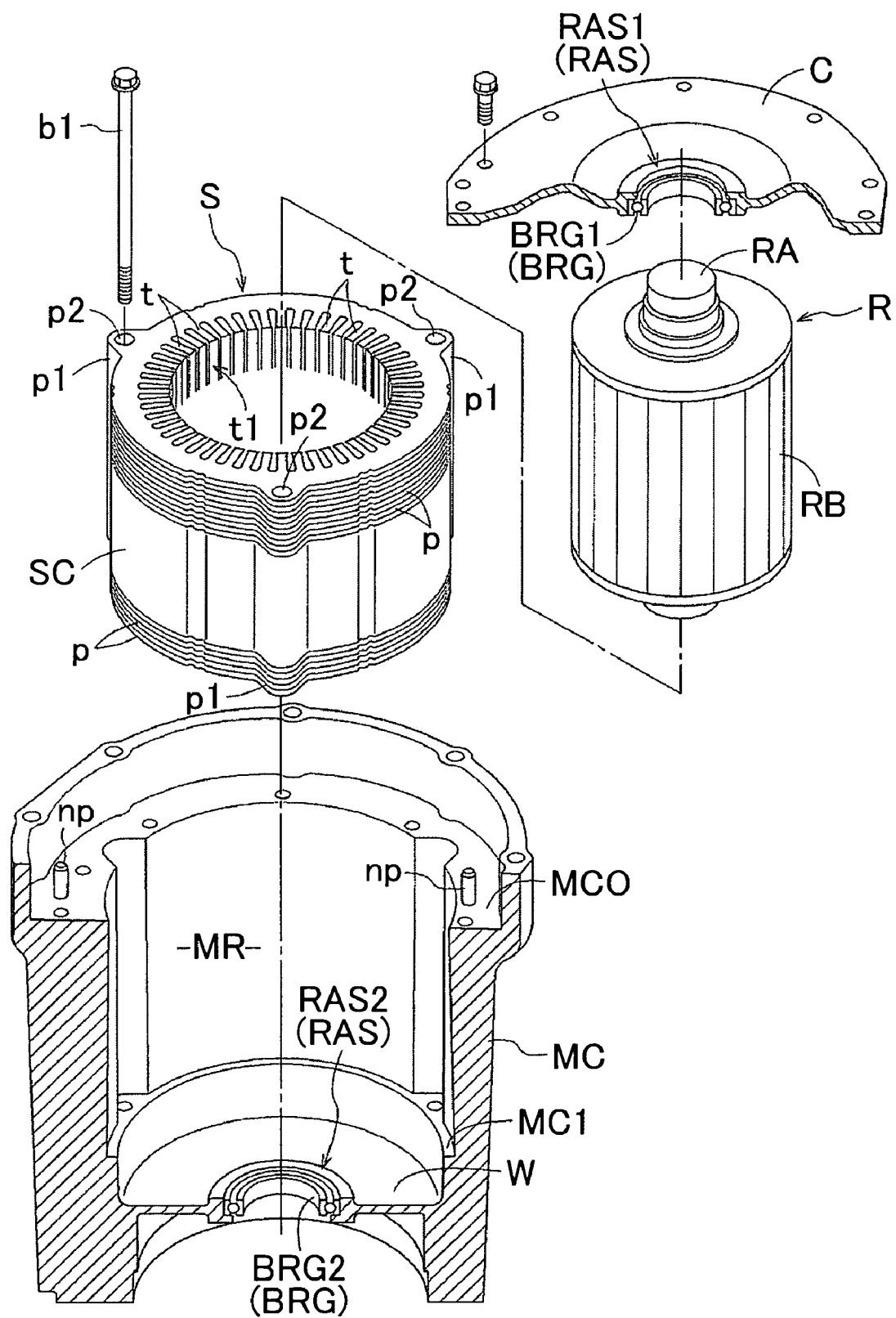
FIG. 2 is a view showing an attachment structure of various parts of the motor driving device.

FIG. 1 is a view showing the cross-sectional structure around a motor driving device M that is housed in and attached to a transmission case MC (an example of a motor case), while FIG. 2 is an exploded view illustrating a support structure of a stator S and a support structure of a rotor R of the motor driving device M. In FIG. 1, the left side is the location of an engine room ER in which an engine E is disposed, and the right side is the location of a speed change mechanism chamber TR in which a speed change mechanism T is disposed. As described above, the rotor R of the motor driving device M is structured to be capable of being drivingly coupled to the engine E and the speed change mechanism T, and is capable of transferring a driving force to and from the engine E and speed change mechanism T, respectively.

As is evident from FIGS. 1 and 2, the motor driving device M includes the stator S and the rotor R. When the rotor R is attached, the rotary axis of the rotor R matches the axis of the stator S, and the axial center position of the rotor R is determined by a pair of shaft-support bearings BRG (BRG1 and BRG2) supported by the transmission case MC. Hereafter, the center of the rotary axis of the rotor R, which is determined on the basis of the pair of shaft-support bearings BRG, will be referred to as the axial center. The direction along the rotary axis will be referred to simply as the axial direction (the direction indicated by D1 in FIG. 1), an orthogonal direction thereto will be referred to as the radial direction (the direction indicated by D2 in FIG. 1), and the peripheral direction thereof will be referred to as the circumferential direction (the direction indicated by D3 in FIG. 1).

The stator S includes a stator core SC and a stator coil SW positioned relative to the stator core SC. The stator core SC is constructed by laminating a large number of substantially annular steel plates p, as shown in FIG. 2. The lamination direction matches the axial direction D1. Each steel plate p employs a structure in which relative movement between the steel plates p is restricted by applying caulking or welding processing at a predetermined phase in the circumferential direction. Further, each steel plate p is provided with protruding portions p1 protruding in the radial direction in three locations at equal intervals in the circumferential direction, and a bolt insertion hole p2 for fixedly fastening the stator core SC to the transmission case MC is provided in each protruding portion p1. The laminated structure stator core SC is fixedly fastened to a seating surface MC1 provided in the transmission case MC by fastening bolts b1 serving as an example of a fastening device and means.

Teeth t protruding radially inward in comb form are provided on the inner diameter side of each steel plate p. The stator coil SW is coiled via cavity portions between each tooth t. Inner diameter side end surfaces t1 of the respective teeth t form an end surface extending in the circumferential direction.

The stator coil SW is impregnated with varnish and fixed in an insulated state. The spaces between the steel plates p are also impregnated with varnish such that the steel plates p are fixed in a state whereby infiltration of water or the like is prevented. Further, by performing this varnish impregnation, improvements in thermal conductivity and heat radiation are achieved.

The positioning of the stator S in the transmission case MC will now be described. The positioning in the axial direction D1 is determined by contact between the end surface of the stator core SC, shown on the right side of FIG. 1 (mainly the end surface of the protruding portions p1), and the seating surface MC1 provided in the transmission case MC. A stator housing space formed in the transmission case MC is formed with a predetermined leeway in the radial direction D2 (the up-down direction in FIG. 1) such that the stator S possesses a predetermined looseness when not fastened to the transmission case MC using the fastening bolts b1. Accordingly, the axial center position of the stator S in the radial direction D2 of the transmission case MC is determined after the fastening bolts b1 are tightened.

The phase of the stator S relative to the transmission case MC in the circumferential direction D3 is determined on the basis of the phase position in the circumferential direction D3 of the seating surface MC1 provided on the transmission case MC relative to the aforementioned protruding portions p1, and is set in accordance with the operation to insert the stator S into the transmission case MC and the fastening operation performed by the fastening bolts b1.

The rotor R includes a rotor main body RB provided on the periphery of a rotor shaft RA, and the rotor shaft RA is shaft-supported from both a shaft-support bearing BRG1 provided on the engine room ER side and a shaft-support bearing BRG2 provided on the speed change mechanism chamber TR side.

As is evident from FIGS. 1 and 2, a motor driving device chamber MR is formed as an independent compartment between the engine room ER and the speed change mechanism chamber TR. In the example shown in the drawings, a partition wall W formed integrally with the transmission case MC is provided between the motor driving device chamber MR and the speed change mechanism chamber TR, and one of the shaft-support bearings BRG2 for supporting the rotor R is provided on the wall W.

Meanwhile, a partition cover C attached fixedly to the transmission case MC is provided between the motor driving device chamber MR and the engine room ER. The partition cover C covers an end surface opening MCO of the transmission case MC from the left side of FIG. 1, thereby defining the motor driving device chamber MR. As is evident from FIGS. 1 and 2, the position of the partition cover C in the radial direction D2 and circumferential direction D3 is determined by a plurality of knock pins np provided in the end surface opening MCO. The other shaft-support bearing BRG1 for supporting the rotor R is provided on the partition cover C.

As is clear from the structure described above, the rotor R of the motor driving device M is supported rotatably by the shaft-support bearing BRG2 provided on the partition wall W and the shaft-support bearing BRG1 provided on the partition cover C. In the present application, a rotor shaft-support portion RAS of the former will be referred to as a case side shaft-support portion RAS2 (an example of a second shaft-support portion), and a rotor shaft-support portion RAS of the latter will be referred to as a cover side shaft-support portion RAS1 (an example of a first shaft-support portion).

Stator Position Measurement Adjustment Device

FIGS. 4 to 8 show the structure of the measurement adjustment device 1.

Figure 4:
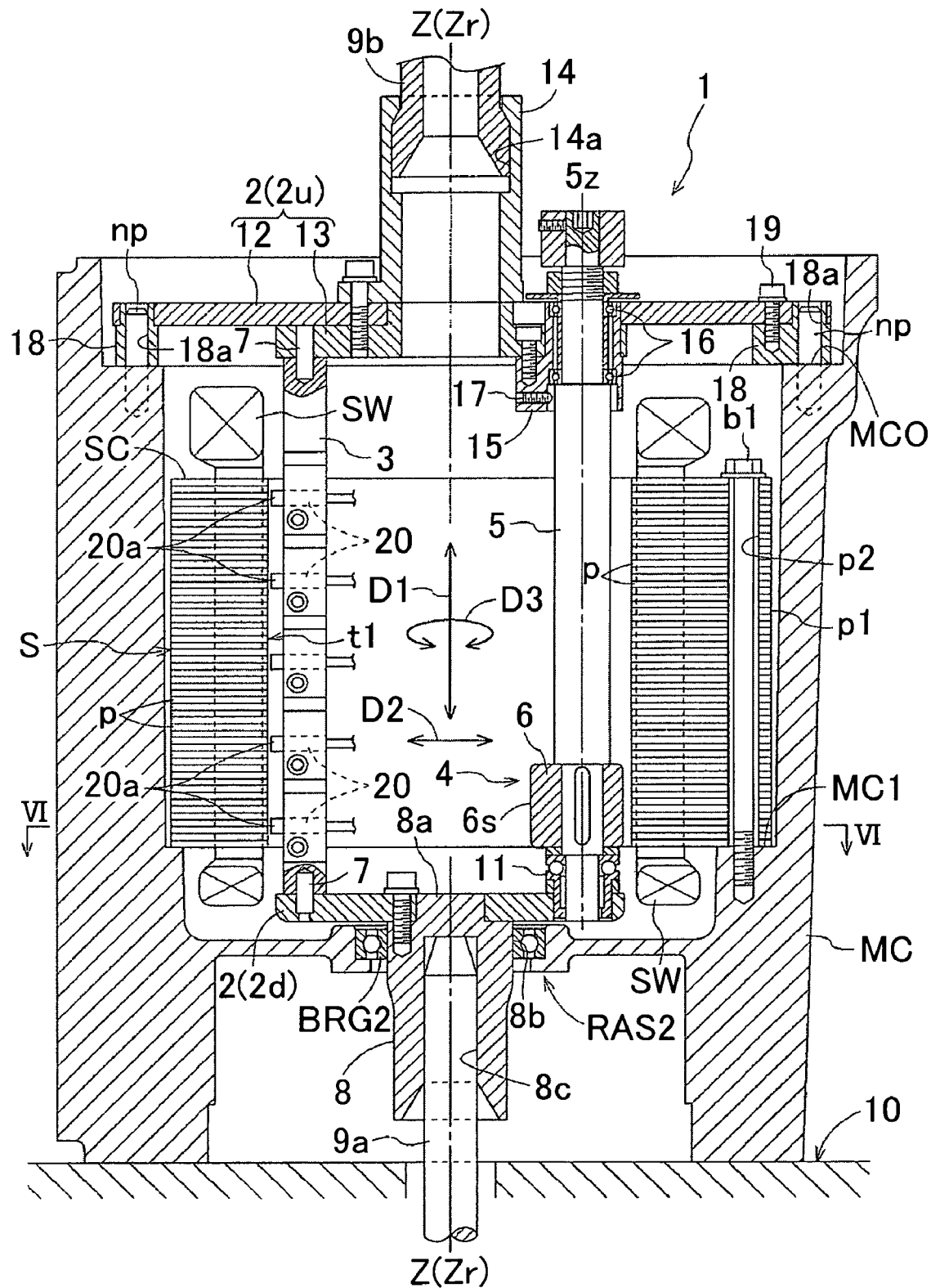
FIG. 4 is a vertical sectional view of a measurement adjustment device in use.
Figure 5:
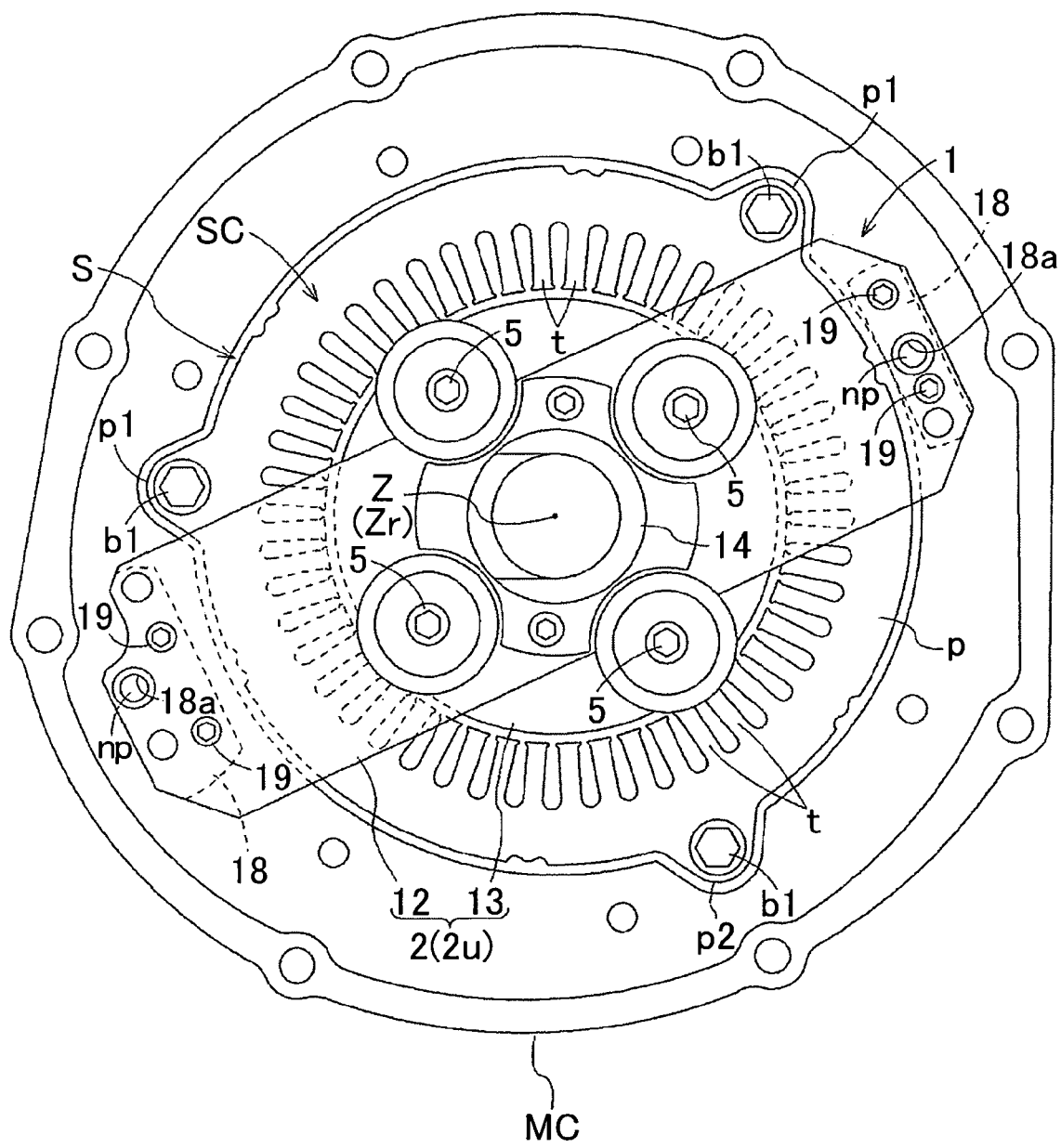
FIG. 5 is a plan view of the measurement adjustment device in use.
Figure 6:
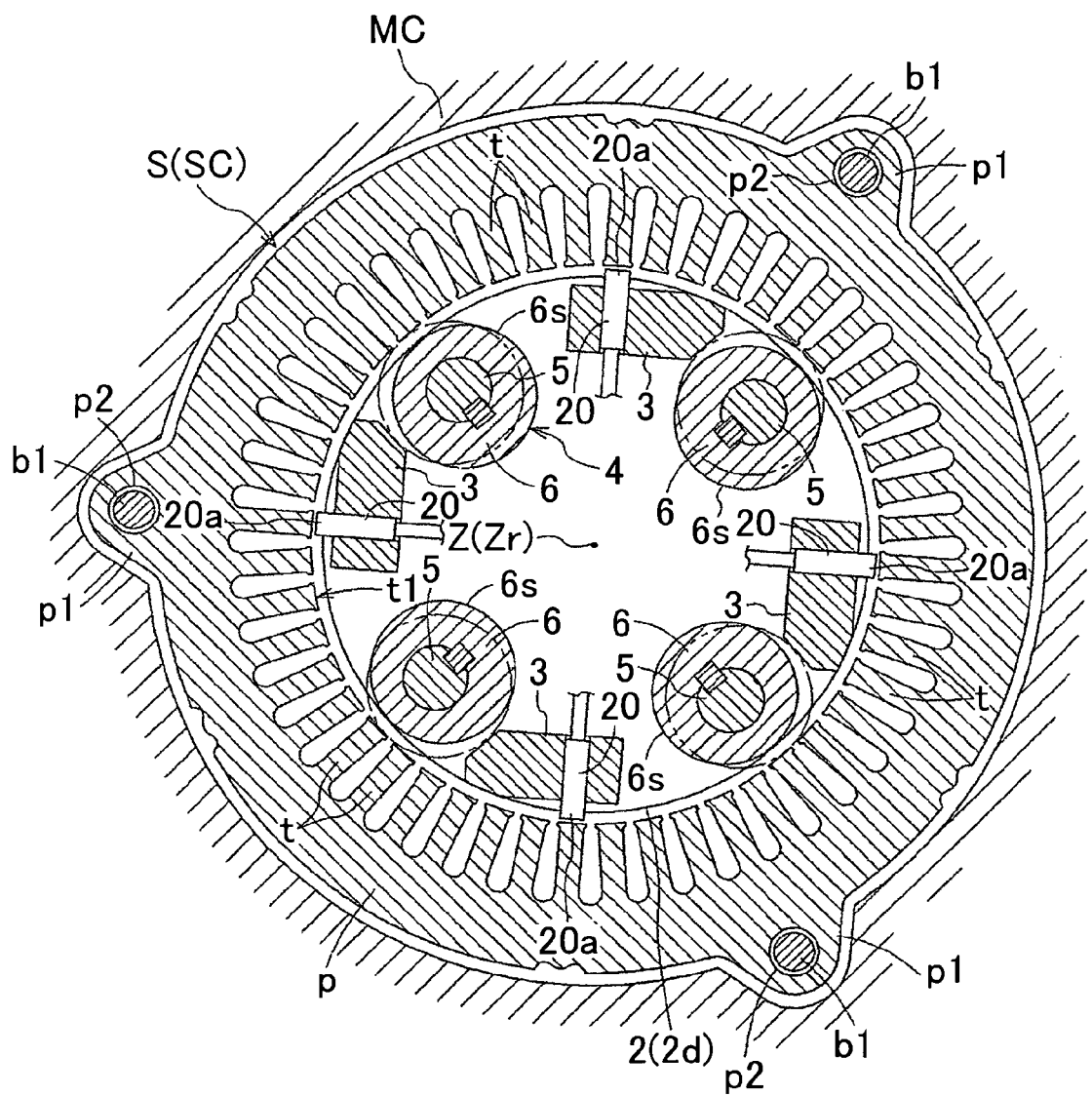
FIG. 6 is a sectional view showing a cross-section of VI-VI in FIG. 4.
Figure 7:
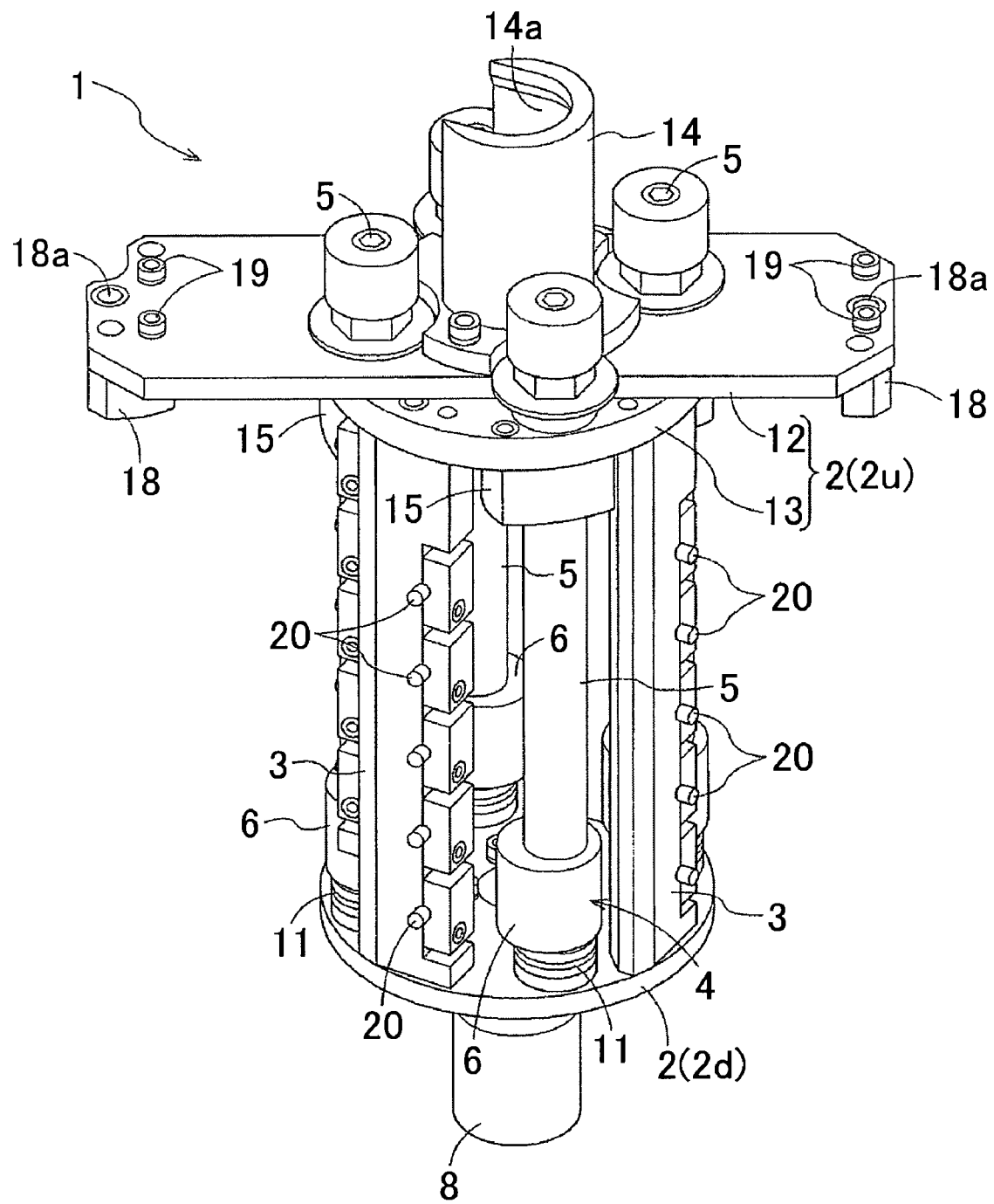
FIG. 7 is a perspective view of the measurement adjustment device.
Figure 8:
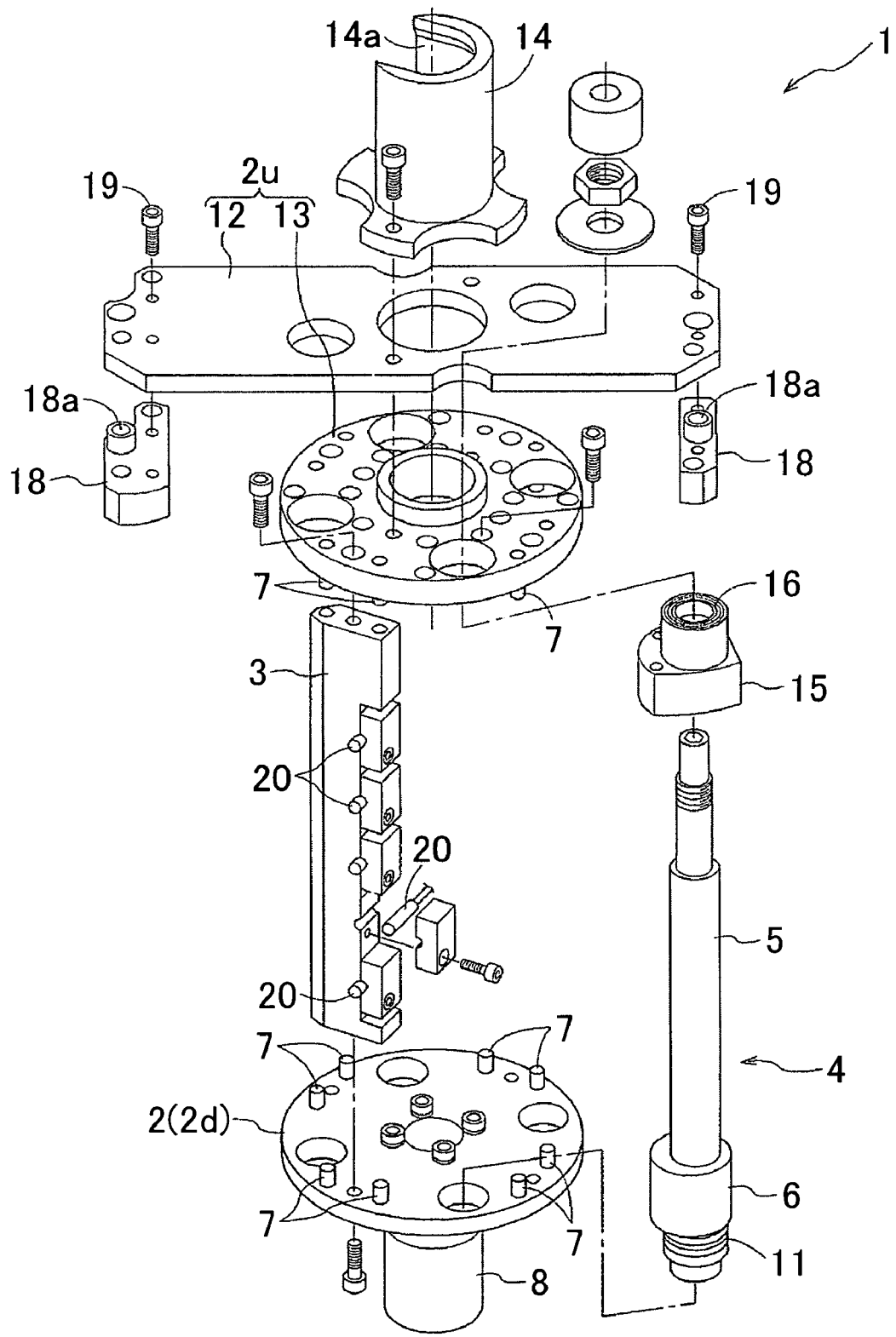
FIG. 8 is an exploded view of the measurement adjustment device.

FIG. 4 is a sectional view showing the main parts of the structure of the measurement adjustment device 1, and illustrates a condition in which the stator S is inserted in the transmission case MC, and the measurement adjustment device 1 is disposed so as to be capable of measuring and adjusting the position of the stator S. FIG. 5 is a plan view corresponding to FIG. 4, FIG. 6 is a VI-VI sectional view of FIG. 4, FIG. 7 is a view showing the measurement adjustment device 1 alone, and FIG. 8 is an exploded view thereof.

The measurement adjustment device 1 is structured to measure the position of the stator S (the position of the stator S in the radial direction D2) in a rotor not-inserted state, in which the stator S is housed in the transmission case MC, the stator S is supported in the axial direction D1 of the rotor R, and the rotor R is not inserted in the stator S. Further, the measurement adjustment device 1 is structured to be capable of adjusting the position of the stator S (the position of an axial center Ss of the stator S relative to an axial center Rs of the rotor R when the rotor R is supported on the transmission case MC) on the basis of the measurement result. The measurement adjustment device 1 is also structured such that the axis thereof (indicated by Z in FIG. 4) is determined from both the case side shaft-support portion RAS2 and the cover side shaft-support portion RAS1.

As is evident from FIGS. 4, 6, 7, and 8, the measurement adjustment device 1 is structured such that end surface plates 2 forming an upper/lower pair in FIG. 4 are fixedly connected by sensor bars 3 provided in four locations in the circumferential direction D3. Four stator position adjustment mechanisms 4 are disposed so as to extend between the upper/lower pair of end surface plates 2 at equal intervals between the respective sensor bars 3. The stator position adjustment mechanisms 4 each include an eccentric cam 6 on a camshaft 5 disposed in the axial direction D1.

Of the upper and lower end surface plates 2, an end surface plate 2d positioned on the lower side is a substantially ring-shaped annular end surface plate 2d, and the four sensor bars 3 are connected fixedly in locations near the outer periphery of one end surface thereof. Each of the sensor bars 3 is positioned strictly on the annular end surface plate 2d using a pair of pins 7. A guide shaft 8 is fixed to the center of the opposite end surface to the end surface to which the sensor bars 3 are fixedly connected.

As shown in FIG. 4, the guide shaft 8 includes on an upper end side thereof a connecting portion 8a connected to the annular end surface plate 2d, and a fitting portion 8b on an outer peripheral location thereof, which is fitted into the shaft-support bearing BRG2 including the aforementioned case side shaft-support portion RAS2. Meanwhile, a first center shaft insertion hole 8c, into which a first center shaft 9a is inserted, is provided in the center of a lower end side. The first center shaft 9a is a guide member provided on an operation device 10 used during an operation to fix the stator S to the transmission case MC, and is provided so as to be capable of moving along an axis Z shown in FIG. 4, i.e. the axial direction D1, from a starting point determined on an orthogonal plane to the axis Z. In the fixing operation, the first center shaft 9a and a second center shaft 9b to be described below are disposed in positions on a rotary axis Zr of the rotor R, which serves as a hypothetical reference during the operation.

Connection support portions including support bearings 11 for supporting the camshaft 5 rotatably are provided on the annular end surface plate 2d in four evenly-spaced locations in the circumferential direction D3. Bearings which are capable of receiving thrust in order to receive a load from the camshaft 5 in the axial direction D1 are used as the support bearings 11.

Of the upper and lower end surface plates 2, an end surface plate 2u positioned on the upper side includes a quadrate plate 12 having a substantially square or rectangle shape, and a connecting plate 13 having a substantially annular shape, as seen from the plan view in FIG. 5. The quadrate plate 12 and connecting plate 13 are structured integrally by bolt connections.

The other ends of the aforementioned four sensor bars 3 are connected fixedly to locations near the outer periphery of the connecting plate 13. Likewise in these connecting positions, each of the sensor bars 3 is positioned strictly using the pair of pins 7. The quadrate plate 12 is positioned on the opposite end surface to the end surface to which the sensor bars 3 are fixedly connected. As shown in FIG. 4, a conveyance handle 14 is fixed to the quadrate plate 12.

The conveyance handle 14 is connected by bolts to the quadrate plate 12 at the opposite end surface to the sensor bars 3, and a center shaft through hole 14a for inserting the second center shaft 9b is provided in an inner diameter location thereof. The second center shaft 9b is used to convey the measurement adjustment device 1, and is also used together with the first center shaft 9a for reference positioning during the fixing operation.

Connection support portions 15 for supporting the camshaft 5 rotatably are provided on the connecting plate 13 in four evenly-spaced locations in the circumferential direction D3. Each connection support portion 15 includes a pair of radial bearings 16 for ensuring that the camshaft 5 is centered favorably in the axial direction D1, and a stud bolt 17 for halting rotation of the camshaft 5 appropriately.

A pin engagement member 18 for positioning the quadrate plate 12 is connected to the quadrate plate 12 in the vicinity of each end in the lengthwise direction thereof using the knock pins np provided in the end portion opening MCO of the transmission case MC. As is evident from FIG. 5, the pin engagement members 18 are fixed to each end of the quadrate plate 12 in the lengthwise direction by a pair of bolts 19, and each pin engagement member 18 includes a positioning hole 18a for inserting the knock pin np. As shown in FIG. 4, when the knock pin np is inserted into the positioning hole 18a, the pin engagement member 18 is placed on the end surface of the end portion opening MCO in the transmission case MC.

In the measurement adjustment device 1, by inserting the guide shaft 8 into the shaft-support bearing BRG2 provided in the case side shaft-support portion RAS2 and inserting the knock pin np into the positioning hole 18a in the pin engagement member 18 provided at the lengthwise direction ends of the quadrate plate 12, the device 1 can be positioned in the axial direction D1, radial direction D2, and circumferential direction D3 relative to the transmission case MC.

More specifically, the device 1 is positioned in the radial direction D2 by the case side shaft-support portion RAS2, and positioned in the axial direction D1 and circumferential direction D3 by the knock pin np and positioning hole 18a.

Further, the relative position between the measurement adjustment device 1, which is positioned in the transmission case MC by the knock pin np and positioning hole 18a, and the stator S, which is fastened and fixed to the transmission case MC by the fastening bolts b1, is determined in the circumferential direction D3 by the relative position of the knock pin np and positioning hole 18a relative to the fastening bolts b1. As shown in FIG. 6, the relative position thereof in the circumferential direction D3 is also set such that a sensor tip end 20a of a displacement sensor 20 supported on the device 1 and the inner diameter side end surface t1 of the teeth t provided on the stator S are disposed so as to face each other with the respective centers thereof substantially matching. Thus, the gap between the sensor tip end 20a and the inner diameter side end surface t1 can be measured accurately by the displacement sensor 20.

Note that other means, such as a bolt and bolt hole, may be used as a positioning device or means for positioning the device 1 in the transmission case MC instead of the knock pin np and the positioning hole 18a.

Measurement and Adjustment of Stator Position

The constitution by which the stator is positioned relative to the measurement adjustment device 1 was described above. Next, measurement and adjustment of the position of the stator S will be described.

As shown in FIGS. 4, 6, 7, and 8, the displacement sensor 20 is supported by the sensor bars 3 serving as supports so as to be capable of measuring the position of the inner diameter surface of the stator core SC of the stator S relative to the axial center of the rotor R. More specifically, five displacement sensors 20 are provided on each of the sensor bars 3 disposed in four evenly-spaced locations in the circumferential direction D3.

Eddy current displacement sensors that detect the distance to a conductor according to a variation in an eddy current inside the conductor produced by electromagnetic induction are employed as the displacement sensors 20. The five displacement sensors 20 are disposed appropriately relative to the width of the stator core SC shown in FIG. 4 in the axial direction D1 in five substantially evenly-spaced locations, including the vicinity of the two ends of the stator core SC, so as to be capable of measuring the gap between the sensor tip ends 20a and the inner diameter side end surface t1, or in other words the tip end surface of the teeth t. Thus, the position of the stator S relative to the axial center of the rotor R in the axial direction D1 can be learned. The displacement sensors 20 are an example of a measuring device or means.

Hence, using the five displacement sensors 20 disposed on each sensor bar 3, the position of the stator S in various locations along the axial direction D1 can be learned.

Further, since the displacement sensor 20 is a non-contact type displacement sensor, such as the aforementioned eddy current displacement sensor, which is selectively sensitive to a magnetic body or a conductor, it is capable of measuring the position of the inner diameter side end surface t1 of the stator core SC accurately without being affected by substances interposed between the displacement sensor 20 and stator core SC other than the magnetic body or conductor, in particular the varnish that is adhered to the radial surface of the stator core SC.

Meanwhile, as described above, the sensor bars 3 are provided in four evenly-spaced locations in the circumferential direction D3, and therefore the position of the stator S in various locations along the circumferential direction D3 can also be learned, and moreover, the circle center position of the stator S can be learned from the output of the displacement sensors 20 disposed in four locations in the circumferential direction D3. Then, by taking an average value of the circle center position of the stator S in each position in the axial direction D1, the position of the axial center (the average axial center Ss shown in FIG. 3B) of the stator S can be learned.

Hence, in the measurement adjustment device 1 according to the present application, the pair of end surface plates 2 connected by the sensor bars 3, the members belonging to the end surface plates 2, and the displacement sensors 20 are examples of the measuring device or means. Further, the mechanism for positioning and supporting the displacement sensors 20 relative to the rotor shaft-support portions RAS, i.e. the pair of end surface plates 2, the sensor bars 3, the guide shaft 8, the pin engagement member 18, and so on, are examples of a support.

As a result, with the measurement adjustment device 1, the axis Z of the measurement adjustment device 1 can be matched to the position of the hypothetical axis Zr of the rotor R, and therefore, as described above, the position of the stator S (the position of the stator core SC) relative to the axial center of the rotor R can be determined strictly by obtaining the output of the displacement sensors 20.

As shown in FIGS. 4, 6, 7, and 8, the eccentric cam 6 is provided on each of the camshafts 5 provided in four evenly-spaced locations in the circumferential direction D3. As shown in FIG. 6, here the eccentric cam 6 has a cam surface 6s which is offset from an axial center 5z of the camshaft 5. Hence, the cam surface 6s is capable of reaching a position that is removed from a position near the axial center 5z of the camshaft as the camshaft 5 rotates. As is evident from FIGS. 4 and 6, the cam surface 6s is disposed so as to abut against the inner peripheral surface of the stator core SC near this removed position, and is therefore capable of moving the stator S in the radial direction D2 by pushing the inner peripheral. surface of the stator core SC (the inner diameter side end surface t1 of the teeth t).

Adjustment in the radial direction D2 was described above, but in the measurement adjustment device 1, unique measures are also taken with respect to the disposal position of the cam 6.

As shown in FIGS. 4 and 7, the cam 6 is disposed in a position corresponding to the lower end portion of the stator core SC in the axial direction D1. In this position, the stator core SC abuts against the seating surface MC1 when inserted into the transmission case MC. In this example, specifically, the cam 6 is disposed such that the lower end surface (bottom surface) of the cam 6 is positioned in a substantially identical plane to the seating surface MC1 of the transmission case MC supporting the lower end surface of the stator core SC (stator S).

As will be described below, adjustment of the stator position using the measurement adjustment device 1 is performed in a vertical attitude with the opening MCO of the transmission case MC open to the upper side. In this condition, the load of the stator S acts on the steel plate p of the stator core in the vicinity of the seating surface MC1, and therefore it is most desirable to adjust the position of the steel plate p in this location. According to a study conducted by the present inventors, when the upper side location of the stator core SC in a vertical direction (the axial direction D1) is pushed by the cam 6 during adjustment while maintaining the vertical attitude, the entire stator S simply tilts relative to the axial direction D1 and the steel plate p contacting the seating surface MC1 cannot be moved easily. As a result, the stator S may return to its original state following adjustment by the eccentric cam 6 such that an adjustment failure occurs.

Hence, in the measurement adjustment device 1, the cam position is set near the lower end of the stator core SC, as described above, so that the position of the stator S in the radial direction D2 can be adjusted appropriately in various locations in the circumferential direction D3 using the eccentric cams 6 disposed at equal intervals in the circumferential direction D3.

In the measurement adjustment device 1 according to the present application, the adjusting device and means include the pair of end surface plates 2 connected by the sensor bars 3, the members belonging to the end surface plates 2, and the stator position adjustment mechanism 4. Furthermore, the stator position adjustment mechanism 4 includes an adjustment tool serving as an example of the adjusting device and means, and the camshaft 5 includes a rotary shaft thereof.

Stator Position Adjustment

Next, a series of operations for measuring the position of the stator S using the measurement adjustment device 1, performing an adjustment on the basis of the measurement result, and fixing the stator S to the transmission case MC will be described.

This series of operations includes (1) a vertical disposal process for disposing the transmission case MC on the operation device 10 in a vertical attitude, (2) an insertion process for inserting the stator S into the transmission case MC, (3) a temporary holding process for temporarily holding the stator S in the transmission case MC, (4) a disposal process for disposing the measurement adjustment device 1 in the stator S, (5) a measuring process for measuring the stator position, (6) a releasing process for releasing the temporary hold, (7) an adjustment amount derivation process for deriving an adjustment amount of the stator S on the basis of the measurement result, (8) an adjustment process for adjusting the stator position with no fastening force, (9) a fixing process for fastening and fixing the stator S to the transmission case MC and (10) a shaft-support process for removing the measurement adjustment device 1 and attaching the rotor R.

These processes will now be described in sequence.

1. Vertical Disposal Process

Figure 9:
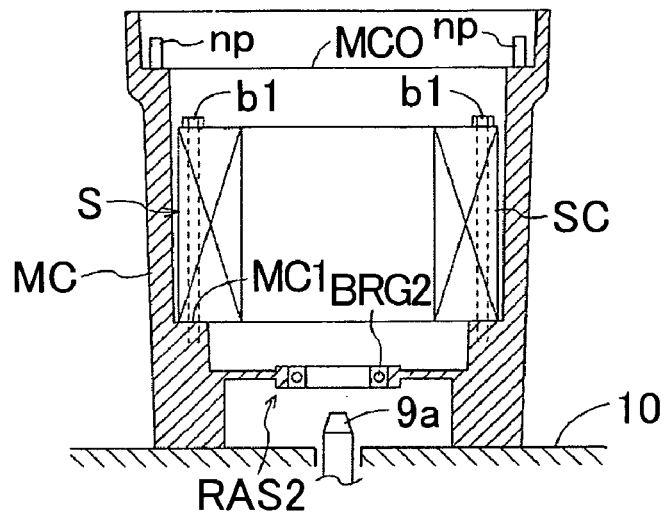
FIG. 9 is an illustrative view of a process for fixing a stator to a transmission case.

In this process, the transmission case MC is disposed on the operation device 10 in a vertical attitude. As shown in FIG. 9, the transmission case MC is disposed such that the end portion opening MCO of the transmission case MC is on the upper side and the case side shaft-support portion RAS2 provided on the transmission case MC is on the lower side. Needless to say, the axis Z of the first and second center shafts 9a, 9b provided on the operation device 10 matches the hypothetical axis Zr of the rotor R determined in the transmission case MC. Here, the operation device 10 includes an attitude holding tool.

At this time, the shaft-support bearing BRG2 in the case side shaft-support portion RAS2 is implanted in the transmission case MC, and the knock pin np is inserted in a predetermined location in the end surface opening MCO. Using these two members BRG2, np, the measurement adjustment device 1, and by extension the stator S, are positioned.

2. Insertion Process

As shown in FIG. 9, the stator S is inserted into the vertical attitude transmission case MC. This insertion operation is performed by dropping the stator S into the transmission case MC such that the stator S is supported on the seating surface MC1 provided in the transmission case MC. Once insertion is complete, the up-down direction position (the axial direction D1 position) of the stator S is fixed, and the relative phase (the circumferential direction D3 position) relationship between the transmission case MC and stator S is also substantially fixed. On the other hand, as described heretofore, a slight looseness is permitted in the horizontal direction (the radial direction D2 position).

3. Temporary Holding Process

As shown in FIG. 9, the stator S is temporarily held within the transmission case MC in a fastened state using the fastening bolts b1. The fastening force at this time is substantially identical to the fastening force generated when the stator S is fixed to the transmission case MC. When this fastening operation is performed, the stator core SC may deform depending on the individual characteristics thereof, as shown in FIG. 3B.

4. Disposal Process

Figure 10:
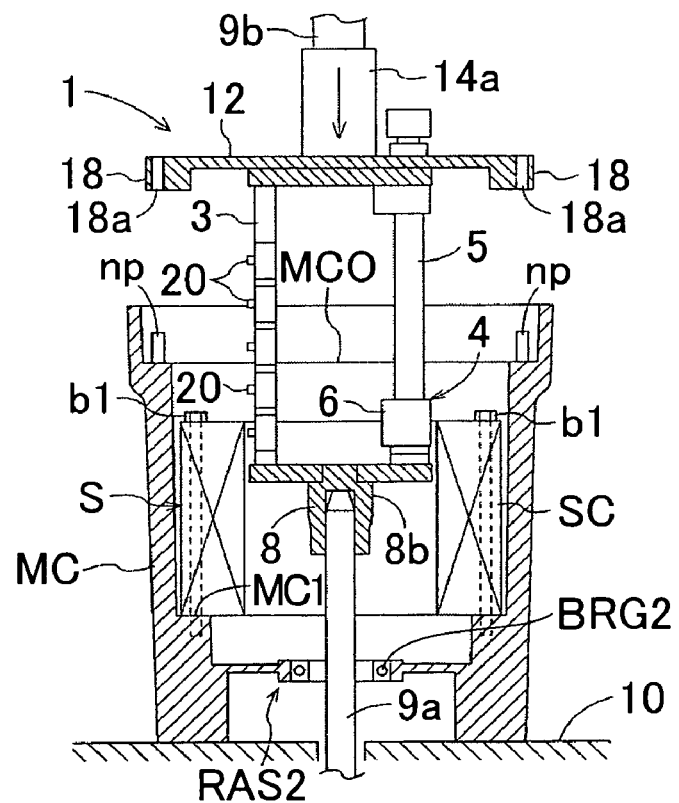
FIG. 10 is an illustrative view of a process for fixing the stator to the transmission case.

As shown in FIG. 10, the measurement adjustment device 1 is disposed inside the transmission case MC with the stator S in a fastened state. This disposal operation is performed using the second center shaft 9b to insert the first center shaft 9a into the guide shaft 8 while the measurement adjustment device 1 is suspended by the conveyance portion 14a.

During the lowering operation, the fitting portion 8b of the guide shaft 8 positioned on the lower side is guided and centered by the shaft-support bearing BRG2 in the case side shaft-support portion RAS2. Meanwhile, the pin engagement members 18 provided on the two end locations of the quadrate plate 12 positioned on the upper side are positioned by the knock pins np.

With this structure, the shaft-support bearing BRG2 exhibits a centering function, and the knock pins np also exhibit a centering function. Moreover, the entire device 1 is supported from the lower side by the end surface opening MCO.

5. Measuring Process

Figure 11:
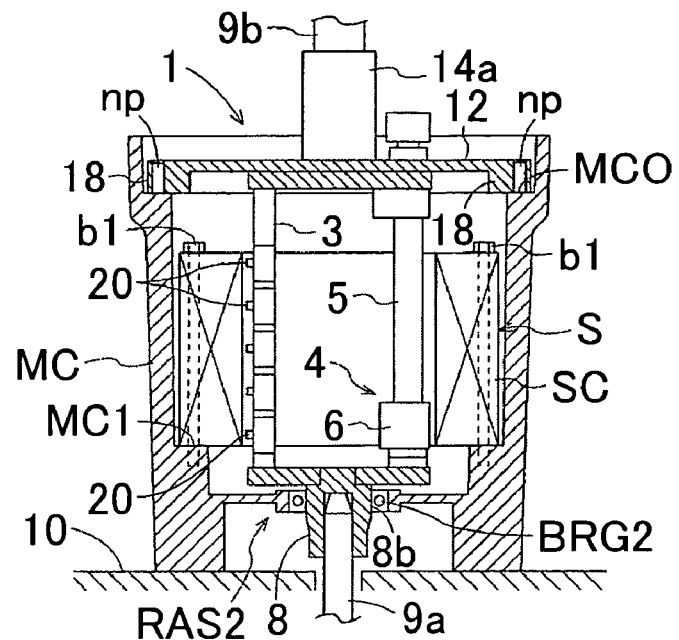
FIG. 11 is an illustrative view of a process for fixing the stator to the transmission case.

As shown in FIG. 11, the position of the inner diameter side end surface t1 of the teeth t provided on the stator core SC is measured using an output from the displacement sensors 20 while the measurement adjustment device 1 is disposed in the transmission case MC.

The output of the displacement sensors 20 is gathered from each displacement sensor 20 in a different position in the up-down direction, and the circle center position of the stator S in different up-down direction positions (axial direction D1 positions) is determined as the state of deformation of the inner diameter surface of the fastened stator S by a computer (not shown) structured to determine the position of the stator S on the basis of the output of the displacement sensors 20. As a result, as shown in FIG. 3B, circle center positions at each height from the seating surface MC1 side through a representative position of the stator S to a location near the upper end are determined individually as coordinates on an orthogonal plane to the axial direction D1. Here, the computer that performs this calculation processing is an example of a stator position deriving device and means. Note that the aforementioned representative position of the stator S denotes the position of the axial center of the stator S determined as an average value of the circle center positions of the stator S in each position in the axial direction D1.

Note that when the axial center positions of the rotor R and stator S match in this measuring process, the following adjustment process need not be performed, and the motor driving device M can be completed by removing the measurement adjustment device 1 from the transmission case MC and attaching the rotor R.

6. Releasing Process

Figure 12:
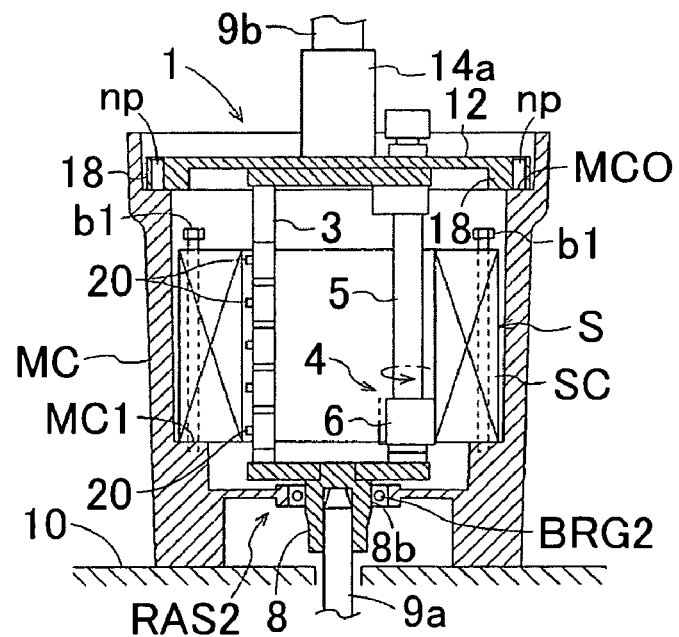
FIG. 12 is an illustrative view of a process for fixing the stator to the transmission case.

As shown in FIG. 12, the fastened state of the stator S is released by loosening the fastening bolts b1, whereby the stator S is set in an open state with no fastening force applied thereto.

7. Adjustment Amount Derivation Process

As shown in FIG. 3D, the position of the stator S is adjusted such that the average axial center Ss, which is an average value of the circle center positions of the stator S at each height, is contained within a predetermined range relative to the hypothetically set axial center Rs of the rotor R with the stator S in a fastened state. Hence, the average value of the circle center positions in each up-down direction position, determined by the aforementioned computer, is calculated, whereby the average axial center Ss of the stator S is determined. The correct circle center position (Sb in FIG. 3D) of the lowermost portion contacting the seating surface for containing the average axial center Ss within the target range is then determined as a target adjustment position. The position in which the lowermost portion circle center position Sb of the stator S contacts the seating surface MC1 of the transmission case MC does not vary, irrespective of whether the stator S is in the fastened state or the open state, and therefore the circle center position Sb of the lowermost portion is set as the target adjustment position when the stator S is in an unfastened state. FIG. 3C shows the relationship between the lowermost portion circle center position Sb and the axial center Rs of the rotor R. Note that the target adjustment position is determined as the position of the stator when the average axial center Ss of the inner diameter surface of the stator S matches the axial center Rs of the rotor R in the representative position of the stator S along the axial direction of the rotor R.

Note that the lowermost portion circle center position Sb set as the target adjustment position of the stator S may be derived on the basis of eccentricity information relating to the eccentricity of the axial center Ss of the fastened stator S to the axial center Rs of the rotor R.

More specifically, in the measuring process described above, the eccentricity direction and an eccentricity distance a of the axial center Ss of the stator S in the fastened state relative to the axial center Rs of the rotor R, as shown in FIG. 3B, is determined as the aforementioned eccentricity information. Then, using an axial center Sso of the stator S prior to adjustment in the open state produced by the releasing process described above as a reference, a position offset by the eccentricity distance a (determined as the eccentric state described above, in an opposite direction to the eccentricity direction, determined as the eccentricity information described above) is derived as the lowermost portion circle center position Sb serving as the target adjustment position of the stator S. Hence, when the stator S having the circle center position Sb derived in this manner as its lowermost portion position is in the fastened state, the axial center Ss thereof matches the axial center Rs of the rotor R. In this case, an operation may be performed to shift the stator S from its current position in the opposite direction to the eccentricity direction by the eccentricity distance a.

Further, instead of the eccentricity information described above, the lowermost portion circle center position Sb set as the target adjustment position of the stator S may be derived on the basis of movement information relating to the movement of the axial center Ss of the stator S in the fastened state from the axial center Sso of the stator S in the open state.

More specifically, after measuring the axial center Ss of the stator S in the fastened state in the measuring process described above, as shown in FIG. 3B, the axial center Sso of the stator S prior to adjustment in the open state produced by the releasing process described above is measured. A movement direction and a movement distance b of the axial center Ss of the stator S in the fastened state shown in FIG. 3B relative to the axial center Sso of the stator S in the open state are then determined as the movement information. Then, using the axial center Rs of the rotor R as a reference, a position offset by the movement distance b (determined as the movement state described above) in an opposite direction to the movement direction, determined as the movement information described above, is derived as the lowermost portion circle center position Sb serving as the target adjustment position of the stator S. Hence, when the stator S having the circle center position Sb derived in this manner as its lowermost position is in the fastened state, the axial center Ss thereof matches the axial center Rs of the rotor R. Note that measurement of the axial center Sso of the stator S in the open state is performed after measurement of the axial center Ss of the stator S in the fastened state, and therefore when the axial center Ss of the stator S in the fastened state already matches the axial center Rs of the rotor R, measurement of the axial center Sso of the stator S in the open state can be omitted to reduce the operation duration. In this case, an operation may be performed to shift the stator S in the opposite direction to the movement direction by the movement distance b using the axial center Rs of the rotor R as a reference.

8. Adjustment Process

As shown in FIG. 12, the stator S is moved and adjusted by operating the camshaft 5 to rotate appropriately so that the lower portion position of the stator S is adjusted to the appropriate lowermost portion circle center position Sb determined in the manner described above. This movement and adjustment of the stator S is performed by operating the camshaft 5 to rotate such that a part of the inner peripheral surface of the stator core SC in the circumferential direction D3 is pushed radially outward by the cam surface 6s of the eccentric cam 6. At this time, the eccentric cam 6 is disposed in a position corresponding to the lower end portion of the stator core SC, and therefore the lowermost portion circle center position of the stator S is moved and adjusted favorably.

In so doing, the average axial center Ss of the representative position of the stator S in the fastened state fastened by the fastening bolts b1 is positioned within the allowable range.

9. Fixing Process

Figure 13:
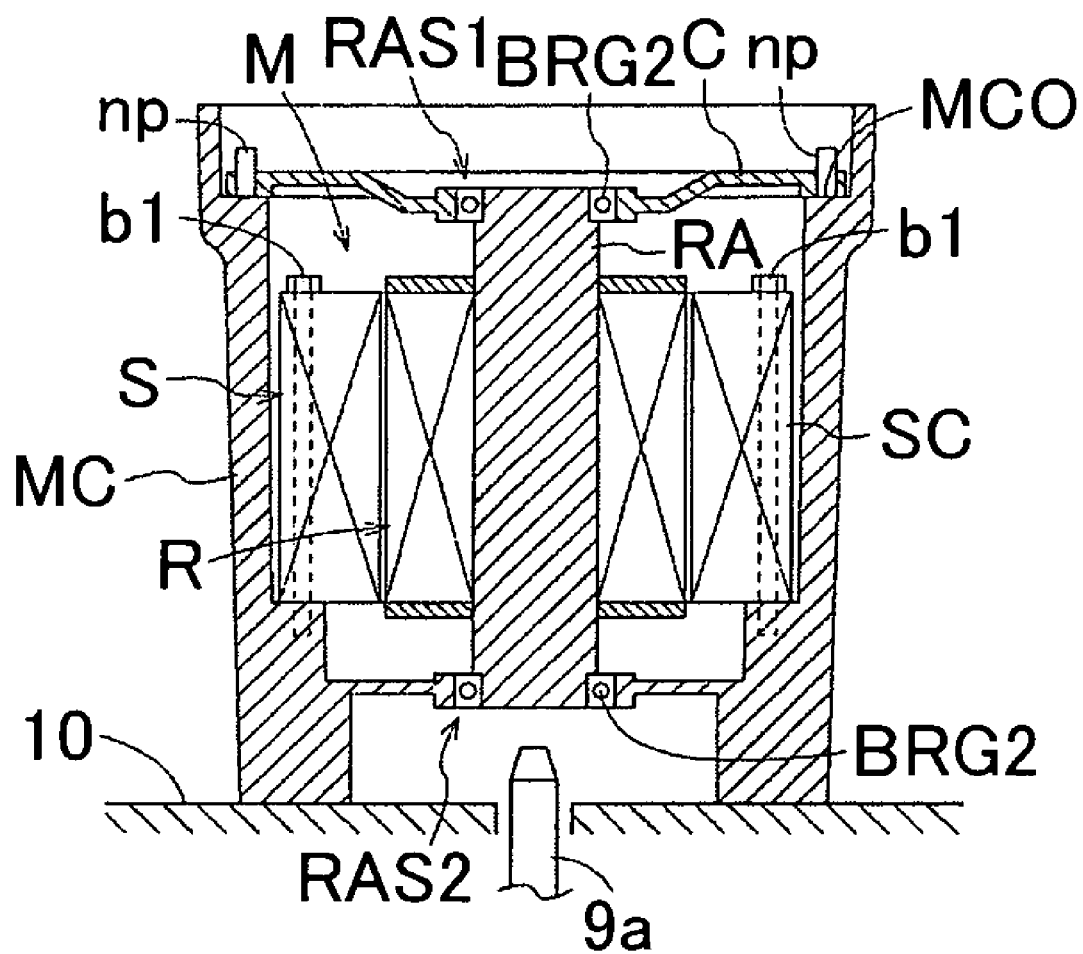
FIG. 13 is an illustrative view of a process for fixing the stator to the transmission case.

Once the adjustment process described above is complete, the stator S is fastened and fixed to the transmission case MC again using the fastening bolts b1, as shown in FIG. 13. By performing the measuring process and adjustment process described above, centering can be performed with an extremely high degree of precision even in the motor driving device M using the laminated stator core SC, which has a tendency to deform in a fastened state. In the final state, as shown in FIG. 3D, the axial centers of the rotor R and stator S match in the representative position m.

10. Shaft-Support Process

When the axial center Rs of the rotor R and the axial center Ss of the stator S match in this manner, the measurement adjustment device 1 is removed from the transmission case MC, the rotor R is attached, and thus the motor driving device M reaches completion.

Further, if the axial center Rs of the rotor R and the axial center Ss of the stator S can be confirmed to match in the measuring process described above, the measurement adjustment device 1 may be removed from the transmission case MC and the rotor R may be attached such that the motor driving device M reaches completion.

Other Embodiments (1) In the embodiment described above, the measurement adjustment device is centered using both the shaft-support bearing provided on the case side shaft-support portion and the knock pins provided on the end portion opening. However, when an operation is performed in a vertical attitude with the measurement adjustment device supported in a vertical direction, as in the embodiment described above, and an attempt is made to align the axial center of the measurement adjustment device with the axial center of the rotor, the radial direction position can be substantially determined at either end of the up-down direction, and therefore either one of the shaft-support bearing provided on the case side shaft-support portion and the knock pins provided on the end portion opening may be used as a reference.

(2) Further, in a structure where the case side shaft-support portion and the cover side shaft-support portion are provided, as illustrated in the embodiment described above, instead of providing the case side shaft-support portion between the motor driving device chamber and the speed change mechanism chamber and providing the cover side shaft-support portion between the engine room and the motor driving device chamber, the cover side shaft-support portion may be provided between the motor driving device chamber and the speed change mechanism chamber and the case side shaft-support portion may be provided between the engine room and the motor driving device chamber.

In the examples described heretofore, one of the shaft-support portions is provided on the case side, and the other shaft-support portion is provided on the cover side. However, a pair of partition covers defining the motor driving device chamber may be provided, and a pair of shaft-support portions may be provided such that the two partition covers respectively support the shaft-support bearings. Hence, in the present application, the shaft-support portion having a shaft-support bearing held by a specific partition cover is referred to as the first shaft-support portion, and the shaft-support portion positioned on the opposite side of the rotor main body to the first shaft-support portion is referred to as the second shaft-support portion.

(3) In the embodiment described above, four locations on the stator inner diameter surface disposed in the circumferential direction D3 serve as measurement and adjustment subjects, but there are no limitations on the number of measurement and adjustment locations, and measurement and adjustment are possible as long as at least three measurement and adjustment locations are provided in the circumferential direction. As the number of measurement and adjustment locations increases, the axial center position of the stator S can be measured and adjusted gradually more accurately. Further, providing four locations has the advantage of enabling direct measurement and adjustment of coordinates of the central axis position on orthogonal coordinates.

Furthermore, in the embodiment described above, the number of measurement locations is equal to the number of adjustment locations, but these numbers may be different.

Further, as regards the phase in the circumferential direction D3, the phase of the stator inner diameter surface locations serving as measurement subjects and the phase of the stator inner diameter surface locations serving as adjustment subjects may match. In this case, in order to perform stator core adjustment favorably, measurement is preferably performed by maintaining the current axial position of the eccentric cam (the position in which the steel plate contacting the seating surface can be adjusted in the radial direction) and attaching a displacement sensor to a location in the upper direction thereof. In so doing, both measurement and adjustment can be performed favorably. When this structure is employed, the adjustment amount can be derived easily.

Further, in the embodiment described above, five locations disposed at equal intervals in the axial direction D1 on the inner diameter surface of the stator S are set as measurement locations to be measured by the displacement sensors 20, but the number of measurement locations is not limited thereto, and as long as at least two locations positioned on the two end sides of the stator S are set as measurement locations, the approximate disposal state of the stator S along the axial direction D1 can be measured. Note, however, that the disposal state of the stator S can be measured more finely as the number of measurement locations increases.

(4) In the embodiment described above, an eddy current displacement sensor is used as a non-contact type displacement sensor that is selectively sensitive to a magnetic body or a conductor, but another type of displacement sensor, such as a magnetic displacement sensor that detects the distance to a magnetic body according to variation in the magnetic field in the vicinity of the magnetic body produced by magnetic induction, may be employed.

Any other type of sensor may also be employed, as long as the position of the inner peripheral surface of the stator core can be detected.

(5) In the embodiment described above, the position of the stator inner diameter surface is adjusted using the eccentric cam, but an adjustment mechanism having a center in the axial center of the rotor, which includes an adjustment portion that can be widened or narrowed in diameter, may be used.

(6) In the embodiment described above, the displacement sensors are disposed to measure positions on the inner diameter surface of the stator core, or in other words positions on the inner diameter side end surface, i.e. the tip end surface of the teeth, but the displacement sensors may be disposed to measure positions on a different radial surface such as the outer diameter surface of the stator core, and the position of the stator core may be determined on the basis of the output of the displacement sensors.

(7) In the embodiment described above, the disposal process for disposing the measurement adjustment device 1 in the stator S is performed after the temporary holding process for temporarily holding the stator S in the transmission case MC, but where appropriate, this sequence of processes may be reversed.

(8) In the embodiment described above, the cam 6 is disposed in a position corresponding to the lower end portion of the stator core SC, or in other words a position in the vicinity of the position in which the stator core SC contacts the seating surface MC1, but the disposal position of the cam 6 is not limited thereto. The cam 6 may be disposed in any position in which the position of the stator S can be adjusted appropriately, and in a preferred embodiment, the cam 6 is disposed so as to move a location of the stator S on the lower side of the center in the vertical direction.

The stator position measuring method and the stator position measuring device according to the present invention may be used effectively as a stator position measuring method and a stator position measuring device capable of measuring the position of a stator core relative to the axial center of a rotor in a motor driving device provided in a hybrid vehicle, for example, whereby stator positioning and adjustment can be performed accurately and quickly.

According to an exemplary aspect of a stator position measuring method and measuring device of the invention, the position of the stator is measured in the aforementioned rotor not-inserted state using a non-contact type displacement sensor that is selectively sensitive to a magnetic body or conductor forming the stator core, and therefore the effects of substances other than the magnetic body or conductor interposed between the displacement sensor and stator core, in particular varnish adhered to the radial surface of the stator core, can be eliminated from the output of the displacement sensor. Hence, the displacement sensor is capable of measuring a position of the radial surface of the stator core relative to the axial center of the rotor accurately, while positioned relative to the axial center of the rotor, so as to exclude the effects of substances other than the stator core, and therefore, the position of the stator can be determined accurately on the basis of the output of the displacement sensor.

Further, since the position of the stator relative to the axial center of the rotor can be determined accurately in this manner, the position of the stator relative to the axial center of the rotor to be inserted later can be adjusted accurately and quickly, whereby the motor driving device can be assembled with a high degree of precision.

According to another exemplary aspect of the invention, the displacement sensor can be disposed comparatively easily and accurately in the interior of the stator, which is opened comparatively widely in the rotor not-inserted state, so as to be capable of measuring the position of the inner diameter surface of the stator core, and as a result, the position of the inner diameter surface of the stator core can be measured more accurately.

Further, since the position of the inner diameter surface of the stator core can be measured accurately, the position of the inner diameter surface of the stator core relative to the axial center of the rotor to be inserted later can be adjusted accurately, and as a result, the motor driving device can be assembled with a high degree of precision such that the gap between the outer peripheral surface of the rotor and the inner diameter surface of the stator core is extremely even.

According to another exemplary aspect of the invention, a plurality of teeth are formed in a protruding manner on an inner diameter side of the stator core, and a position of a tip end surface of the teeth is measured as the position of the inner diameter surface of the stator core using the displacement sensor.

In other words, the displacement sensor can be disposed comparatively easily and accurately in the interior of the stator, which is opened comparatively widely in the rotor not-inserted state, so as to be capable of measuring the position of the tip end surface of the teeth formed in a protruding manner on the inner diameter surface of the stator core, and as a result, the position of the tip end surface of the teeth can be measured more accurately while avoiding the gaps between the teeth forming the inner diameter surface of the stator core.

Further, since the position of the tip end surface of the teeth can be measured accurately, the position of the tip end surface of the teeth relative to the axial center of the rotor to be inserted later can be adjusted accurately, and as a result, the motor driving device can be assembled with a high degree of precision such that the gap between the outer peripheral surface of the rotor and the tip end surface of the teeth is extremely even.

According to another exemplary aspect of the invention, the inner diameter surface of the stator is measured from the inside by positioning the displacement sensor using the rotor shaft-support portion, which serves as a shaft-support reference when incorporating the rotor, as a reference. In so doing, it is possible to obtain a measurement result from which concentricity between the rotor and stator in an assembled state can be derived.

As a result, an adjustment amount relative to the axial center of the rotor can be derived easily and appropriately from the measurement result obtained using this measurement method and measuring device, and therefore adjustment can be performed accurately and quickly.

Here, "positioning using the shaft-support portion as a reference" is a concept including both "a case in which positioning is performed directly from each shaft-support portion" and "a case in which positioning is performed from a reference position (the position of positioning means to be described below) for determining the position of the shaft-support portion".

According to another exemplary aspect of the invention, a plurality of radial positions on the inner diameter surface of the stator can be measured accurately at once using the plurality of displacement sensors positioned relative to the rotor shaft-support portion by a support. As a result, the position of the stator can be measured quickly and accurately. Furthermore, with this constitution, the plurality of displacement sensors are supported in positions relative to the rotor shaft-support portion, which serves as a shaft-support reference when incorporating the rotor. Hence, the position of the stator relative to the axial center of the rotor when the rotor is attached can be determined quickly and accurately.

According to another exemplary aspect of the invention, the position of the radial center of the stator can be measured without moving the displacement sensors in the circumferential direction. Hence, the position of the stator can be measured quickly and accurately.

According to another exemplary aspect of the invention, at least positions near the two ends of the stator in the axial direction of the rotor can be measured without moving the displacement sensors in the axial direction of the rotor. Hence, the position of the stator can be measured even more quickly and accurately. Moreover, by further increasing the number of measurement locations to be measured by the displacement sensors in the axial direction of the rotor, the accuracy with which the position of the stator is measured can be increased without moving the displacement sensors in the axial direction of the rotor.

According to another exemplary aspect of the invention, the displacement sensors are positioned using one or both of the first shaft-support portion and second shaft-support portion, which serve as references during assembly of the motor driving device, as a reference. By performing positioning using the shaft-support portions for determining the position of the rotor rotary shaft, the concentricity between the stator and rotor can be aligned strictly.

Here, when one of the first shaft-support portion and second shaft-support portion is used as a reference, the operation can be facilitated by maintaining the motor case and the stator housed therein in an attitude whereby the rotor is oriented in a vertical direction and performing centering comparatively easily using one of the shaft-support portions as a reference, for example.

On the other hand, when both shaft-support portions are used as a reference, the pair of shaft-support portions actually used to support the rotor are used as references, and therefore strict concentricity can be secured.

According to another exemplary aspect of the invention, the shaft-support bearing for supporting the rotor is used directly, and therefore the relationship between the stator and rotor when the rotor is attached can be simulated reliably. Hence, an accurate measurement result from which concentricity can be derived extremely effectively is obtained, and adjustment can be performed accurately and quickly.

According to another exemplary aspect of the invention, the shaft-support bearing for supporting the rotor is not used directly as a reference, and instead, a position of the positioning means, which position the partition cover for holding the shaft-support bearing, relative to the partition cover is used as the reference position. Hence, the relationship between the stator and rotor when the rotor is attached can be simulated reliably, albeit indirectly. Likewise in this case, an accurate measurement result from which concentricity can be derived extremely effectively is obtained, and adjustment can be performed accurately and quickly.

According to another exemplary aspect of the invention, the end surface opening is a comparatively large opening, and therefore the radial position of the rotor can be obtained accurately using two positions near the outer periphery thereof as references. Hence, the relationship between the stator and rotor when the rotor is attached can be simulated reliably, albeit indirectly. Likewise in this case, an accurate measurement result from which concentricity can be derived extremely effectively is obtained, and adjustment can be performed accurately and quickly.

According to another exemplary aspect of the invention, when an eddy current displacement sensor (also known as a high-frequency oscillation displacement sensor), which detects the distance to a conductor from variation in an eddy current in the conductor caused by electromagnetic induction, is used, the position of the radial surface of the stator core, which is constituted by a conductor, can be measured more accurately while eliminating the effects of substances other than the stator core by implementing the stator position measuring method and measuring device according to the present invention described above.

The invention claimed is:

1. A stator position measuring method relating to a motor driving device comprising a motor case, a rotor, and a stator disposed on an outer periphery of the rotor concentrically with the rotor, comprising:
   measuring a position of the stator relative to an axial center of the rotor,
   wherein the position of the stator is determined in a rotor not-inserted state, in which the stator is housed inside the motor case and the rotor is not inserted in the stator, by measuring a position of a radial surface of a stator core, which includes a magnetic body or a conductor forming the stator, relative to the axial center of the rotor using a non-contact displacement sensor that is selectively sensitive to the magnetic body or the conductor.

2. The stator position measuring method according to claim 1, wherein a position of an inner diameter surface of the stator core is measured as the position of the radial surface of the stator core using the displacement sensor.

3. The stator position measuring method according to claim 2, wherein:
   a plurality of teeth are formed in a protruding manner on an inner diameter side of the stator core, and
   a position of a tip end surface of the teeth is measured as the position of the inner diameter surface of the stator core using the displacement sensor.

4. The stator position measuring method according to claim 2, wherein:
   the displacement sensor is positioned using a rotor shaft-support portion, that shaft-supports the rotor on the motor case, as a reference, and
   the position of the inner diameter surface of the stator relative to the axial center of the rotor is measured using the displacement sensor.

5. The stator position measuring method according to claim 4, wherein:
   radial positions in a plurality of locations on the inner diameter surface of the stator are measured by a plurality of displacement sensors positioned relative to the rotor shaft-support portion, and
   the position of the stator relative to the axial center of the rotor is determined on the basis of an output of the displacement sensors.

6. The stator position measuring method according to claim 5, wherein at least three locations in a circumferential direction of the rotor, serving as the plurality of locations on the inner diameter surface of the stator, are set as measurement locations to be measured by the displacement sensors.

7. The stator position measuring method according to claim 5, wherein at least two locations positioned at each end side of the stator in an axial direction of the rotor, serving as the plurality of locations on the inner diameter surface of the stator, are set as measurement locations to be measured by the displacement sensors.

8. The stator position measuring method according to claim 4, wherein:
the motor case comprises a motor case main body that is structured to house the stator and the rotor in an interior thereof, and a partition cover covering an opening at one end portion of the motor case main body in the axial direction of the rotor,
the rotor shaft-support portion includes a first shaft-support portion provided on the partition cover and a second shaft-support portion positioned on an opposite side of the rotor main body to the first shaft-support portion, and
the displacement sensors are positioned using one or both of the first shaft-support portion and the second shaft-support portion as the reference.

9. The stator position measuring method according to claim 8, wherein:
the second shaft-support portion comprises a shaft-support bearing held on the motor case main body, and
to position the displacement sensors from the second shaft-support portion, positioning is performed using at least an inner diameter surface of the shaft-support bearing as the reference.

10. The stator position measuring method according to claim 8, wherein;
the first shaft-support portion comprises a shaft-support bearing held on the partition cover,
a positioning device that positions the partition cover on the motor case main body is provided between the partition cover and the motor case main body, and
to position the displacement sensors using the first shaft-support portion as a reference, positioning is performed using a position of the positioning device on the motor case main body side as the reference.

11. The stator position measuring method according to claim 10, wherein:
the positioning device positions the partition cover using at least two positions set in an end surface opening of the motor case main body as a reference, and
to position the displacement sensors using the first shaft-support portion as the reference, the displacement sensors are positioned using the at least two positions as the reference.

12. A stator position measuring device relating to a motor driving device comprising a motor case, a rotor, and a stator disposed on an outer periphery of the rotor concentrically with the rotor, comprising:
a non-contact displacement sensor that is selectively sensitive to a magnetic body or a conductor that measures a position of the stator relative to an axial center of the rotor; and
a support that is positioned inside the motor case in a rotor not-inserted state, in which the stator is housed inside the motor case and the rotor is not inserted in the stator, wherein:
the displacement sensor is positioned by the support so as to be capable of measuring a position of a radial surface of a stator core, which is includes the magnetic body or the conductor forming the stator, relative to the axial center of the rotor, and
the position of the stator is determined on the basis of an output of the displacement sensor.

13. The stator position measuring device according to claim 12, wherein the displacement sensor is positioned in the stator by the support so as to be capable of measuring a position of an inner diameter surface of the stator core as the position of the radial surface of the stator core.

14. The stator position measuring device according to claim 13, wherein:
a plurality of teeth are formed in a protruding manner on an inner diameter side of the stator core, and
the displacement sensor is positioned by the support so as to be capable of measuring a position of a tip end surface of the teeth as the position of the inner diameter surface of the stator core.

15. The stator position measuring device according to claim 12, wherein the displacement sensor is an eddy current displacement sensor.

16. The stator position measuring device according to claim 13, wherein the support is positioned using a rotor shaft-support portion for shaft-supporting the rotor on the motor case as a reference.

17. The stator position measuring device according to claim 16, wherein a plurality of displacement sensors capable of measuring radial positions in a plurality of locations on the inner diameter surface of the stator are disposed on the support.

18. The stator position measuring device according to claim 17, wherein at least three locations in a circumferential direction of the rotor, serving as the plurality of locations on the inner diameter surface of the stator, are set as measurement locations to be measured by the displacement sensors.

19. The stator position measuring device according to claim 17, wherein at least two locations positioned at each end side of the stator in an axial direction of the rotor, serving as the plurality of locations on the inner diameter surface of the stator, are set as measurement locations to be measured by the displacement sensors.

20. The stator position measuring device according to claim 16, wherein:
the motor case comprises a motor case main body that is structured to house the stator and the rotor in an interior thereof, and a partition cover covering an opening at one end portion of the motor case main body in the axial direction of the rotor,
the rotor shaft-support portion includes a first shaft-support portion provided on the partition cover and a second shaft-support portion positioned on an opposite side of the rotor main body to the first shaft-support portion, and
the displacement sensors are positioned using one or both of the first shaft-support portion and the second shaft-support portion as the reference.

21. The stator position measuring device according to claim 20, wherein:
the second shaft-support portion comprises a shaft-support bearing held on the motor case main body, and
to position the displacement sensors from the second shaft-support portion, positioning is performed using at least an inner diameter surface of the shaft-support bearing as a reference.

22. The stator position measuring device according to claim 20, wherein:
- the first shaft-support portion comprises a shaft-support bearing held on the partition cover,
- a positioning device that positions the partition cover on the motor case main body is provided between the partition cover and the motor case main body, and
- to position the displacement sensors using the first shaft-support portion as a reference, positioning is performed using a position of the positioning device on the motor case main body side as the reference.

23. The stator position measuring device according to claim 22, wherein:
- the positioning device positions the partition cover using at least two positions set in an end surface opening of the motor case main body as a reference, and
- to position the displacement sensors using the first shaft-support portion as the reference, positioning is performed using the at least two positions as the reference.

* * * * *